(12) United States Patent
Tout

(10) Patent No.: US 7,523,687 B2
(45) Date of Patent: Apr. 28, 2009

(54) CONVEYOR DRIVE INCLUDING A FLUID COUPLING AND A STEP-UP GEARBOX

(75) Inventor: John Tout, Worcester (GB)

(73) Assignee: Joy MM Delaware, Inc., Wilmington, DE (US)

( * ) Notice: Subject to any disclaimer, the term of this patent is extended or adjusted under 35 U.S.C. 154(b) by 604 days.

(21) Appl. No.: 11/267,969

(22) Filed: Nov. 7, 2005

(65) Prior Publication Data

US 2006/0096413 A1 May 11, 2006

(30) Foreign Application Priority Data

Nov. 8, 2004 (GB) ................................. 0424618.7

(51) Int. Cl.
*H02K 7/116* (2006.01)
*F16H 33/00* (2006.01)
*F16H 35/00* (2006.01)
*F16H 37/00* (2006.01)

(52) U.S. Cl. ........................................ 74/640; 74/421 A
(58) Field of Classification Search ................... 74/650, 74/640, 655, 421 A; 180/65.5–65.7
See application file for complete search history.

(56) References Cited

U.S. PATENT DOCUMENTS

| | | | | |
|---|---|---|---|---|
| 2,347,788 A | * | 5/1944 | Nardone | 475/337 |
| 2,353,436 A | * | 7/1944 | Binney | 105/113 |
| 2,412,829 A | * | 12/1946 | Nardone | 74/7 C |
| 4,183,585 A | * | 1/1980 | Brennan | 299/43 |
| 4,449,349 A | * | 5/1984 | Roth | 53/66 |
| 4,963,760 A | * | 10/1990 | Sugiyama | 290/48 |
| 6,443,295 B1 | * | 9/2002 | Hill | 198/788 |
| 6,447,336 B1 | | 9/2002 | Fannin et al. | 439/587 |

* cited by examiner

*Primary Examiner*—Tisha Lewis
(74) *Attorney, Agent, or Firm*—James Earl Lowe, Jr.

(57) ABSTRACT

A longwall conveyor drive including a motor including a motor output shaft, a drive sprocket, and a gearbox drivingly connected to the drive sprocket. The drive also includes a fluid coupling drivingly connected to the gearbox, and a step-up gearbox located between the motor and the fluid coupling. The step-up gearbox includes a housing attached to the output end of the motor, a first gear stage rotatably supported within the housing and drivingly receiving the motor output shaft and rotating at a first speed, and a second stage gear set rotatably supported within the housing and in driven contact with the first stage gear set and rotating at a higher speed, the second stage gear set including an output shaft connected to the fluid coupling.

1 Claim, 2 Drawing Sheets

CONVEYOR DRIVE INCLUDING A FLUID COUPLING AND A STEP-UP GEARBOX

BACKGROUND OF THE INVENTION

This invention relates to a conveyor drive, and, more particularly, to a longwall conveyor drive including a fluid coupling and a gearbox.

SUMMARY OF THE INVENTION

One of the principal objects of the invention is to provide a longwall conveyor drive with a higher motor output speed. The higher motor output speed increases the power of the longwall drive.

More particularly, this invention provides a longwall conveyor drive including a motor including a motor output shaft, a drive sprocket, and a gearbox drivingly connected to the drive sprocket. The drive also includes a fluid coupling drivingly connected to the gearbox, and a step-up gearbox located between the motor and the fluid coupling. The step-up gearbox includes a housing attached to the output end of the motor, a first gear stage rotatably supported within the housing and drivingly receiving the motor output shaft and rotating at a first speed, and a second stage gear set rotatably supported within the housing and in driven contact with the first stage gear set and rotating at a higher speed, the second stage gear set including an output shaft connected to the fluid coupling.

Figure 1:
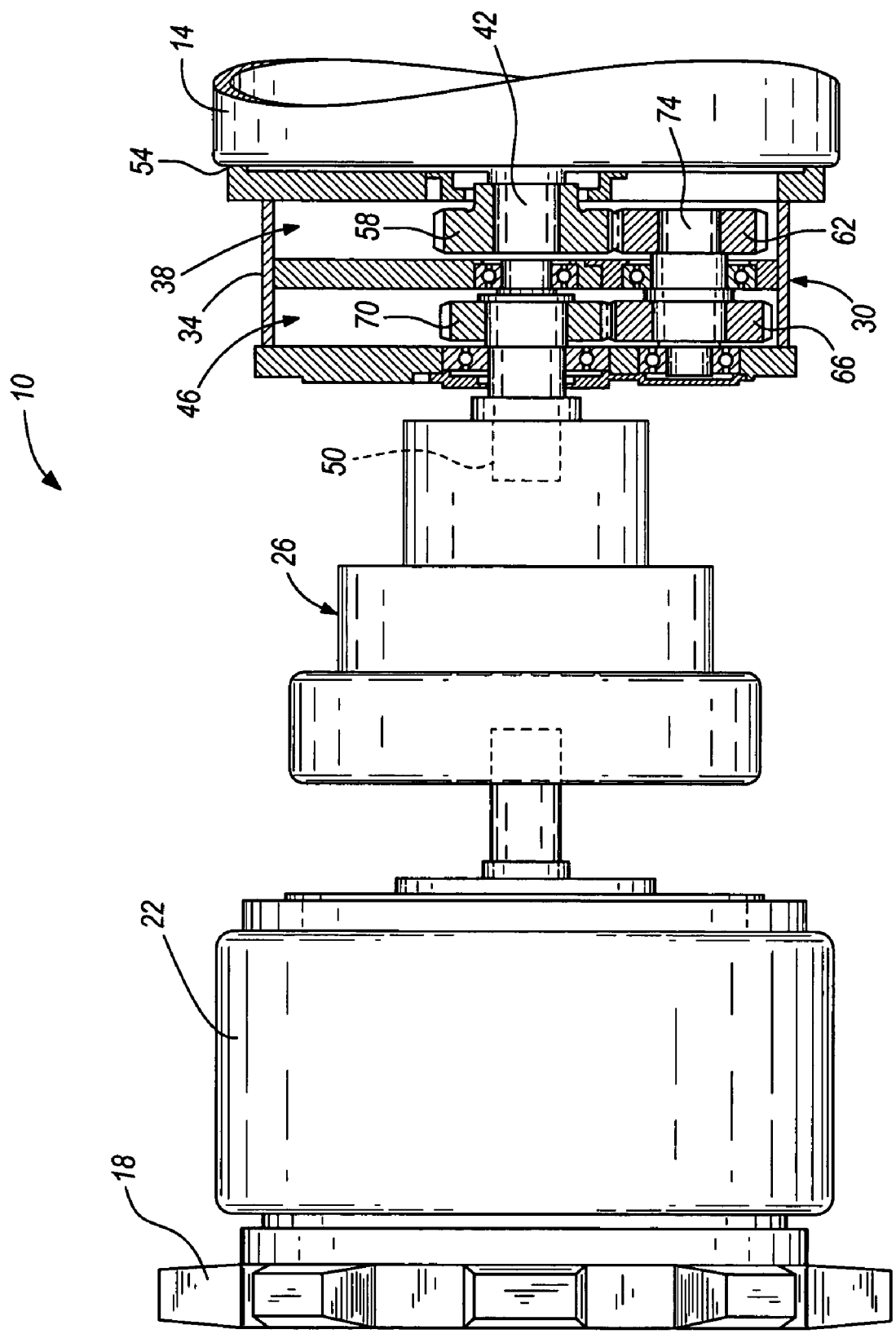
FIG. 1 is a side view of a longwall conveyor drive of this invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience in reference to the drawings and are not to be construed as limiting terms.

DETAILED DESCRIPTION OF THE PREFERRED EMBODIMENT

Figure 2:
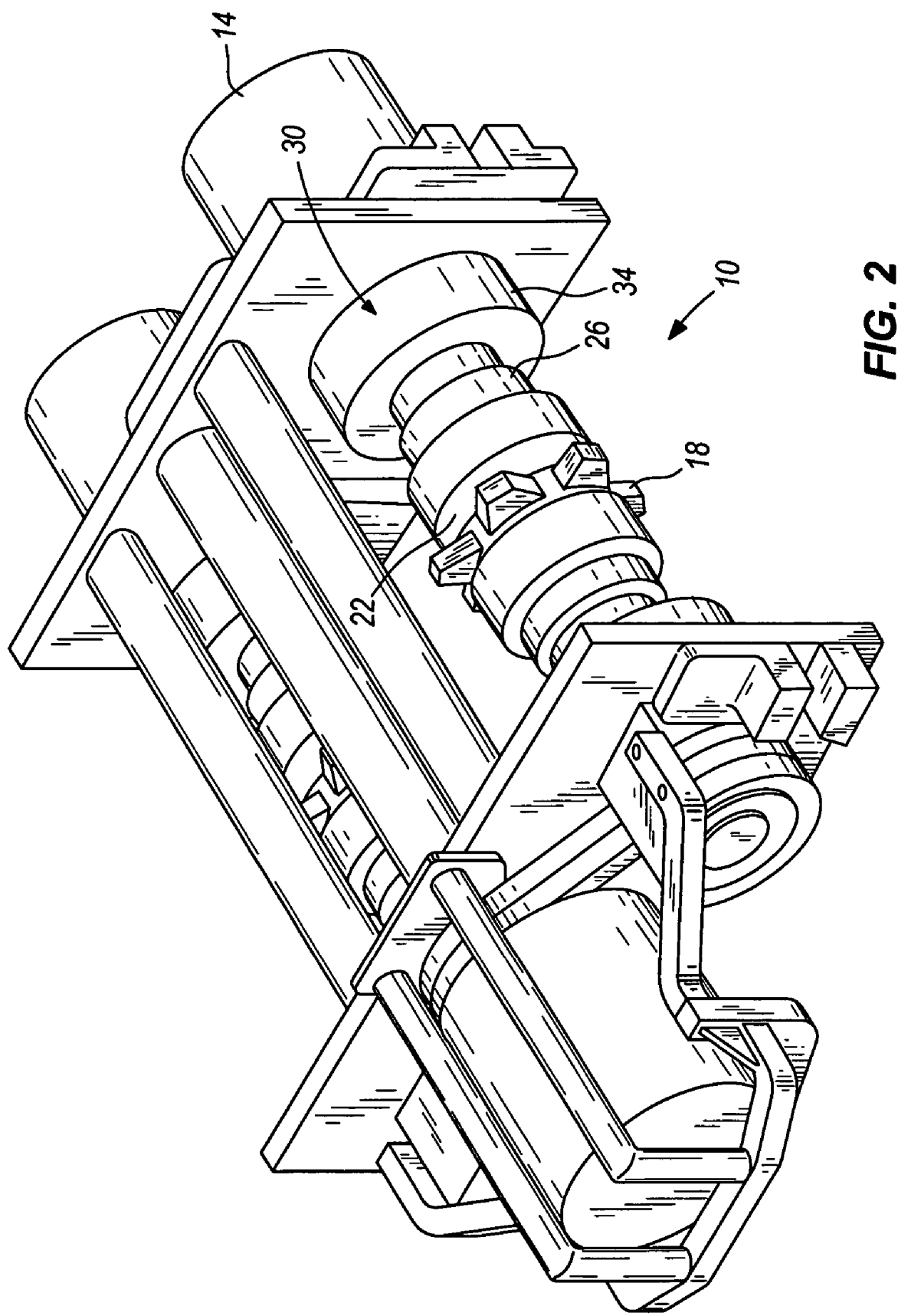
FIG. 2 is a perspective view of part of the longwall conveyor assembly system.

Illustrated in FIGS. 1 and 2 is a longwall conveyor drive 10 including a motor 14, a drive sprocket 18, a gearbox 22 connected to the drive sprocket 18, a fluid coupling 26 connected to the gearbox 22, and a step-up gearbox 30 located between the motor 14 and the fluid coupling 26.

The step-up gearbox 30 includes a housing 34, a first gear stage 38 supported within the housing 34 and adapted to receive the motor output shaft 42, and a second stage gear set 46 in driving contact with the first stage gear set 38, the second stage gear set 46 including an output shaft 50 connected to the fluid coupling 26, the second stage gear set 46 being supported within the housing 34.

More particularly, the motor 14 includes a motor output shaft 42. The gearbox 30 is drivingly connected in a conventional manner to the drive sprocket 18. The fluid coupling 26 is drivingly connected in a conventional manner to the gearbox 22.

The step-up gearbox housing 34 is attached to the output end of the motor 54. The first stage gear set 38 is rotatably supported within the housing 34 and drivingly receives the motor output shaft 42 and rotates at a first speed, and the second stage gear set 46 is rotatably supported within the housing 34 and in driven contact with the first stage gear set 38 and rotates at a higher speed.

More particularly, the first gear stage 38 includes a first gear 58 mounted within the step-up gearbox housing 34 and attached to and driven by the motor output shaft 42, and a second gear 62 mounted within the step-up gearbox housing 34 and attached to a step-up gearbox shaft 74, the second gear 62 being driven by the first gear 58. Whenever a gear is attached to or drivingly connected to a shaft herein, it is either by a spline, or alternatively by a key or a similar conventional means of attaching a gear to a shaft.

The second stage gear set 46 includes a third gear 66 mounted within the step-up gearbox housing 34 and attached to the step-up gearbox shaft 74. The third gear 66 is larger than the second gear 62. The second stage gear set 46 further includes a fourth gear 70 mounted within the step-up gearbox housing and drivingly connected to the step-up gearbox output shaft 50, that in turn is driving connected to the fluid coupling 26. The fourth gear 70 is driven by the third gear 66 and is smaller in diameter than the first gear 58. As a result, the rotational speed of the output shaft 50 is faster than the rotational speed of the motor shaft 42. In the preferred embodiment, the motor shaft 42 rotates at 1500 revolutions per minute, and the output shaft 50 rotates at 1800 revolutions per minute.

Various other features and advantages of the invention will be apparent from the following claims.

The invention claimed is:

1. A longwall conveyor drive including a motor including a motor output shaft, a drive sprocket, a gearbox drivingly connected to the drive sprocket, a fluid coupling drivingly connected to the gearbox, and a step-up gearbox located between the motor and the fluid coupling, said step-up gearbox including a housing attached to the output end of the motor, a first gear stage rotatably supported within said housing and drivingly receiving the motor output shaft and rotating at a first speed, and a second stage gear set rotatably supported within the housing and in driven contact with the first stage gear set and rotating at a higher speed, the second stage gear set including an output shaft connected to the fluid coupling, wherein said first gear stage includes a first gear mounted within the step-up gearbox housing and attached to the motor output shaft, a second gear mounted within the step-up gearbox housing and attached to a step-up gearbox shaft, said second gear being driven by said first gear, and wherein said second stage gear set includes a third gear mounted within the step-up gearbox housing and attached to said step-up gearbox shaft, said third gear being larger than said second gear, and a fourth gear mounted within the step-up gearbox housing and drivingly connected to said step-up gearbox output shaft, said fourth gear being driven by said third gear and being smaller in diameter than said first gear.

* * * * *